(12) United States Patent
Keusenkothen et al.

(10) Patent No.: US 8,696,888 B2
(45) Date of Patent: Apr. 15, 2014

(54) HYDROCARBON RESID PROCESSING

(75) Inventors: Paul F. Keusenkothen, Houston, TX (US); Megan L. Renstrom, Houston, TX (US); Julian A. Wolfenbarger, Houston, TX (US); Stephen H. Brown, Bernardsville, NJ (US); John S. Buchanan, Lambertville, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1626 days.

(21) Appl. No.: 11/581,882

(22) Filed: Oct. 17, 2006

(65) Prior Publication Data

US 2007/0090018 A1   Apr. 26, 2007

Related U.S. Application Data

(60) Provisional application No. 60/728,640, filed on Oct. 20, 2005, provisional application No. 60/813,555, filed on Jun. 14, 2006.

(51) Int. Cl.
*C10G 9/36* (2006.01)

(52) U.S. Cl.
USPC ............ 208/130; 208/14; 208/57; 208/60; 208/62; 208/66; 208/80; 208/89; 208/92; 208/106; 208/132; 585/251; 585/648; 585/649; 585/650

(58) Field of Classification Search
USPC .......... 208/14, 57, 60, 61, 62, 66, 80, 89, 92, 208/106, 130, 132; 585/251, 648, 649, 650
See application file for complete search history.

(56) References Cited

U.S. PATENT DOCUMENTS

| | | | |
|---|---|---|---|
| 3,558,474 A | 1/1971 | Gleim et al. | |
| 3,586,619 A | 6/1971 | Stine | |
| 3,617,493 A * | 11/1971 | Wirth et al. | ............... 208/80 |
| 3,720,729 A | 3/1973 | Sze et al. | |
| 3,842,138 A | 10/1974 | Chahvekilian et al. | |
| 3,855,113 A | 12/1974 | Gould | |
| 3,898,299 A | 8/1975 | Jones | |
| 3,944,481 A | 3/1976 | Wing et al. | |
| 4,005,006 A | 1/1977 | Montagna | |
| 4,057,490 A | 11/1977 | Wynne, Jr. | |
| 4,065,379 A | 12/1977 | Soonawala et al. | |
| 4,179,355 A | 12/1979 | Frayer et al. | |
| 4,180,453 A | 12/1979 | Franck et al. | |
| 4,210,520 A | 7/1980 | Wernicke et al. | |
| 4,257,871 A | 3/1981 | Wernicke et al. | |
| 4,297,204 A | 10/1981 | Schliebener et al. | |
| 4,298,458 A | 11/1981 | Banta et al. | |
| 4,713,221 A | 12/1987 | Montgomery et al. | |

(Continued)

FOREIGN PATENT DOCUMENTS

| | | |
|---|---|---|
| EP | 0110433 | 6/1984 |
| GB | 2071133 | 9/1981 |

(Continued)

OTHER PUBLICATIONS

Erdoel & Kohle, Erd Gas Petrochemie (1981), 34(1), 443-6.

*Primary Examiner* — Prem C Singh
*Assistant Examiner* — Michelle Stein

(57) ABSTRACT

The invention concerns integration of hydroprocessing and steam cracking. A feed comprising crude or resid-containing fraction thereof is severely hydrotreated and passed to a steam cracker to obtain an olefins product.

9 Claims, 5 Drawing Sheets

(56) References Cited

U.S. PATENT DOCUMENTS

| | | |
|---|---|---|
| 5,069,775 A | 12/1991 | Grosboll |
| 5,271,826 A * | 12/1993 | Krambeck et al. ............ 208/113 |
| 5,902,554 A | 5/1999 | Kirkbride |
| 6,054,496 A | 4/2000 | Crane et al. |
| 6,149,800 A * | 11/2000 | Iaccino et al. ................. 208/61 |
| 6,190,533 B1 | 2/2001 | Bradow et al. |
| 6,303,842 B1 | 10/2001 | Bridges et al. |
| 6,620,311 B2 | 9/2003 | Morel et al. |
| 6,632,351 B1 | 10/2003 | Ngan et al. |
| 6,743,961 B2 | 6/2004 | Powers |
| 6,989,091 B2 | 1/2006 | Jorgensen |
| 2002/0195373 A1 | 12/2002 | Ino et al. |
| 2003/0070808 A1 | 4/2003 | Allison |
| 2004/0004022 A1 | 1/2004 | Stell et al. |
| 2004/0004027 A1 | 1/2004 | Spicer et al. |
| 2004/0004028 A1 | 1/2004 | Stell et al. |
| 2004/0035864 A1 | 2/2004 | Mino |
| 2004/0039240 A1 | 2/2004 | Powers |
| 2004/0065589 A1 | 4/2004 | Jorgensen |
| 2005/0133405 A1 | 6/2005 | Wellington |
| 2005/0133406 A1 | 6/2005 | Wellington |
| 2005/0133414 A1 | 6/2005 | Bhan et al. |
| 2005/0133415 A1 | 6/2005 | Bhan et al. |
| 2005/0133416 A1 | 6/2005 | Bhan et al. |
| 2005/0133417 A1 | 6/2005 | Bhan et al. |
| 2005/0133418 A1 | 6/2005 | Bhan et al. |
| 2005/0135997 A1 | 6/2005 | Wellington et al. |
| 2005/0139512 A1 | 6/2005 | Wellington et al. |
| 2005/0139518 A1 | 6/2005 | Bhan et al. |
| 2005/0139519 A1 | 6/2005 | Bhan et al. |
| 2005/0139520 A1 | 6/2005 | Bhan et al. |
| 2005/0139521 A1 | 6/2005 | Bhan et al. |
| 2005/0139522 A1 | 6/2005 | Bhan et al. |
| 2005/0145536 A1 | 7/2005 | Wellington et al. |
| 2005/0145537 A1 | 7/2005 | Wellington et al. |
| 2005/0145538 A1 | 7/2005 | Wellington et al. |
| 2005/0145543 A1 | 7/2005 | Bhan et al. |
| 2005/0150818 A1 | 7/2005 | Bhan et al. |
| 2005/0155906 A1 | 7/2005 | Wellington et al. |
| 2005/0155908 A1 | 7/2005 | Bhan et al. |
| 2005/0167320 A1 | 8/2005 | Bhan et al. |
| 2005/0167321 A1 | 8/2005 | Wellington et al. |
| 2005/0167322 A1 | 8/2005 | Wellington et al. |
| 2005/0167323 A1 | 8/2005 | Wellington et al. |
| 2005/0167324 A1 | 8/2005 | Bhan et al. |
| 2005/0167325 A1 | 8/2005 | Bhan et al. |
| 2005/0167326 A1 | 8/2005 | Bhan et al. |
| 2005/0167327 A1 | 8/2005 | Bhan et al. |
| 2005/0167328 A1 | 8/2005 | Bhan et al. |
| 2005/0167329 A1 | 8/2005 | Bhan et al. |
| 2005/0167330 A1 | 8/2005 | Bhan et al. |
| 2005/0167331 A1 | 8/2005 | Bhan et al. |
| 2005/0167332 A1 | 8/2005 | Bhan et al. |
| 2005/0170952 A1 | 8/2005 | Wellington et al. |
| 2005/0173298 A1 | 8/2005 | Wellington et al. |
| 2005/0173303 A1 | 8/2005 | Bhan et al. |
| 2005/0209495 A1 | 9/2005 | McCoy et al. |
| 2005/0261530 A1 | 11/2005 | Stell et al. |
| 2005/0261531 A1 | 11/2005 | Stell et al. |
| 2005/0261532 A1 | 11/2005 | Stell et al. |
| 2005/0261533 A1 | 11/2005 | Stell et al. |
| 2005/0261534 A1 | 11/2005 | Stell et al. |
| 2005/0261535 A1 | 11/2005 | Beattie et al. |
| 2005/0261536 A1 | 11/2005 | Stell et al. |
| 2005/0261538 A1 | 11/2005 | Stell |
| 2006/0014992 A1 | 1/2006 | Stell et al. |
| 2006/0014993 A1 | 1/2006 | Stell et al. |
| 2006/0014994 A1 | 1/2006 | Keusenkothen |
| 2006/0089519 A1 | 4/2006 | Stell et al. |
| 2006/0094918 A1 | 5/2006 | McCoy et al. |
| 2006/0129012 A1 | 6/2006 | Frye et al. |

FOREIGN PATENT DOCUMENTS

| | | |
|---|---|---|
| JP | 57212294 | 6/1981 |
| JP | 58005393 | 7/1981 |
| JP | 58098387 | 12/1981 |
| WO | 2000/40677 | 7/2000 |
| WO | WO 2004/005431 | 1/2004 |
| WO | 2007/005473 | 1/2007 |
| WO | 2007/047657 | 4/2007 |
| WO | 2007/047941 | 4/2007 |

* cited by examiner

HYDROCARBON RESID PROCESSING

RELATED APPLICATIONS

This application claims benefit of and priority to U.S. provisional patent application Ser. No. 60/728,640, filed Oct. 20, 2005, and also claims benefit of U.S. provisional patent application No. 60/813,555, filed Jun. 14, 2006.

FIELD OF THE INVENTION

The invention relates to a method of making olefins from a crude or resid-containing crude fraction.

BACKGROUND OF THE INVENTION

Thermal cracking of hydrocarbons is a petrochemical process that is widely used to produce olefins such as ethylene, propylene, butylenes, butadiene, and aromatics such as benzene, toluene, and xylenes. Each of these is a valuable commercial product in its own right. For instance, the olefins may be oligomerized (e.g., to form lubricant basestocks), polymerized (e.g., to form polyethylene, polypropylene, and other plastics), and/or functionalized (e.g., to form acids, alcohols, aldehydes and the like), all of which have well-known intermediate and/or end uses. One thermal cracking process is steam cracking, which involves cracking hydrocarbons in the presence of hydrogen and/or hydrogen-containing components, such as steam.

The starting feedstock for a conventional olefin production plant, as described above, has been subjected to substantial (and expensive) processing before it reaches the olefin plant. Normally, whole crude is first subjected to desalting prior to being distilled or otherwise fractionated or cracked into a plurality of parts (fractions) such as gasoline, kerosene, naphtha, gas oil (vacuum or atmospheric) and the like, including a high boiling residuum ("resid"). The resid cut typically has a boiling point of greater than about 650° F. (343° C.), at about atmospheric pressure. After desalting and removal of the resid fractions, conventionally, any of these fractions, other than the 650° F.+ (343° C.+) resid, may be passed to a steam cracker or olefin production plant as the feedstock for that plant.

Typically in steam cracking, a hydrocarbon feedstock for steam cracking, such as naphtha, gas oil, or other non-resid containing fractions of whole crude oil, which may be obtained, for instance, by distilling or otherwise fractionating whole crude oil, is usually mixed with steam and introduced to a steam cracker. Conventional steam cracking utilizes a pyrolysis furnace that generally has two main sections: a convection section and a radiant section. In the conventional pyrolysis furnace, the hydrocarbon feedstock enters the less severe convection section of the furnace as a liquid (except for light feedstocks which enter as a vapor) wherein it is heated and vaporized by indirect contact with hot flue gas from the radiant section and optionally by direct contact with steam. The vaporized feedstock and steam mixture (if present) is then introduced through crossover piping into the radiant section where it is quickly heated, at pressures typically ranging from about 10 to about 30 psig, to a severe hydrocarbon cracking temperature, such as in the range of from about 1450° F. (788° C.) to about 1550° F. (843° C.), to provide thorough thermal cracking of the feedstream. The resulting products, comprising olefins, leave the pyrolysis furnace for further downstream separation and processing.

After cracking, the effluent from the pyrolysis furnace contains gaseous hydrocarbons of great variety, e.g., saturated, monounsaturated, and polyunsaturated, and can be aliphatic and/or aromatic, as well as significant amounts of molecular hydrogen. The cracked product is then further processed such as in the olefin production plant to produce, as products of the plant, the various separate individual streams of high purity mentioned above, i.e., hydrogen, the light olefins ethylene, propylene, butenes, and aromatic compounds, as well as other products such as pyrolysis gasoline.

As worldwide demand for light olefins increases and the availability of favorable crude sources is depleted, it becomes necessary to utilize heavier crudes (i.e., those having higher proportions of resid), which requires increased capital investments to process and handle the refining byproducts and purchase the higher grade feedstocks. It is highly desirable to have processes that can take lower cost, heavier crudes, and produce a more favorable product mix of light olefins, more efficiently.

It has previously been proposed to upgrade certain crude fractions other than resid, prior to steam cracking, by first hydroprocessing the feed. For instance, U.S. Pat. Nos. 3,855,113 and 6,190,533 are directed to an integrated process comprising passing the feed to a hydroprocessing zone followed by a steam cracking zone. In neither case, however, is whole crude or a fraction comprising resid passed directly to the hydroprocessing zone or to the steam cracker. See also GB 2,071,133 and Erdoel & Kohle, Erdgas, Petrochemie (1981), 34(1), 443-6. Other references of interest include U.S. Pat. Nos. 3,855,113; 4,057,490; 4,179,355; and 6,743,961.

Conventional resid hydroprocessing or "residfining" is a known process for upgrading a portion of the resid containing crude fraction. The hydrogenated liquid and vapor products (but not the resid products) from residfining are typically fractionated into more valuable streams, e.g., fuel oil, diesel, heating oil, jet, kerosene, gasoline, LPG, and fuel gas. Each of these is useful per se as fuels and/or as intermediates for the production of, for instance, petrochemicals. By way of example, fuel oil may also be cracked to produce the lighter boiling fuels, such as gasoline, LPG, and fuel gas and/or the petrochemicals ethylene, propylene, and butanes. The resid fraction is typically a low-value product. However, subsequent to hydroprocessing and before or during the further distillation of the resid stream, conversion, deasphalting, or other processing may be performed on the resid containing crude fraction.

U.S. Pat. No. 3,898,299 discloses a process for removing the resid fractions and producing olefins from the non-resid, lower boiling point hydrocarbons. Atmospheric resid from distillation is hydroprocessed and the liquid hydroprocessor effluent is "fed in the presence of steam directly to the pyrolysis zone wherein unvapourized feedstock is removed as a residue fraction in a separation zone prior to entry of the vapourised distillate fraction into that region of the pyrolysis zone maintained under conditions which effect thermal cracking." However, the '299 reference only teaches conventional hydroprocessing and thermal steam cracking of the non-resid-containing overhead stream and does not properly suggested or teach how to use the resid-containing effluent from a resid hydroprocessing unit as a feed for a steam cracker. The '299 patent requires removal of the 650° F.+ (343° C.+) boiling point fractions, from the treated hydroprocessor effluent. Only the distillate fractions are processed to olefins. Those skilled in the art are well aware of the practical difficulties involving equipment fouling of conventional equipment of the U.S. Pat. No. 3,898,299 patent, for steam cracking resid-containing feeds. Resid hydroprocessing is a known process for upgrading resid to fuels such as fuel oil, diesel, heating oil, jet, kerosene, gasoline, LPG, and fuel gas.

Each of these is useful as fuels and/or as intermediates for the production of, for instance, petrochemicals.

WO 2004/005431 discloses a process for steam cracking certain feedstocks comprising resid, whereby a substantial unconverted liquid resid fraction is removed prior to steam cracking. The '5431 invention does not disclose or teach hydrogenation as a process useful for upgrading heavy, sour, crude oil and resid feedstocks, including the resid fractions, such that the whole crude, including resid fractions, may be steam cracked and converted to petrochemicals. Heavy, sour feedstocks do not contain high concentrations of the linear paraffins, which are known to make the highest quality steam cracker feedstocks. The atmospheric and vacuum resid fractions of crude oils containing >2.0 wt % sulfur almost always have a hydrogen content <12.5 wt % and typically they have a hydrogen content of <11.0 wt %. It is well known that conventional resid hydroprocessing produces product highly prone to fouling.

Other patents of interest related to cracking heavy feeds include U.S. Pat. No. 4,257,871, to Wernicke; U.S. Pat. No. 4,065,379, to Soonawala; U.S. Pat. No. 4,180,453, to Franck; and U.S. Pat. No. 4,210,520, to Wernicke. There remains in the art, means and processes for economical processing of heavy, resid containing whole crudes, and resid containing hydrocarbon fractions thereof, for the production of olefins, aromatics, and other valuable petrochemical products. All known art previous to this invention, has deficiencies, shortcomings, or undesirable aspects.

SUMMARY OF THE INVENTION

The present inventors have surprisingly discovered that resid hydroprocessing that is increased in severity and heat integrated with a steam cracker, may be used to produce useful products such as olefins and/or aromatic compounds by integration of at least one hydroprocessing step and at least one thermal cracking step.

This invention provides a process by which a hydroprocessing effluent containing a resid fraction therein may be used as steam cracker feed. The inventors have also discovered that crude or a resid-containing fraction thereof may be hydroprocessed for use as steam cracker feed stock. The hydroprocessed, resid-containing feedstock may be steam cracked to produce useful products such as olefins and/or aromatic compounds. The invention is directed to a process integrating hydrogenation of a resid-containing material with steam cracking to obtain an olefins product.

In an embodiment, there is a process of producing olefins from a feedstream comprising crude or crude fractions containing resid, the process including a step of hydroprocessing and a step of thermal cracking. The present invention is directed to a process comprising the use of the hydrogenated resid-containing effluent from a resid hydroprocessor as feed to a steam cracker that is capable of rejecting the only the heaviest resid components of the feedstream and passing substantially only vapor components into the radiant section of the steam cracker. A portion of the vaporized component fed to the steam cracker is from resid. The invention is also directed to a process for hydrogenating a resid-containing feed material to render the mixture suitable as a resid-containing feedstock for feeding at least a portion thereof into a steam cracker. In another aspect the process comprises integrating hydrogenation of a resid-containing material with steam cracking to obtain an olefins product.

In one embodiment, the feed for the steam cracker is Vacuum Gas Oil (VGO). In another embodiment, the feed for the steam cracker is Atmospheric Gas Oil (AGO). In still another embodiment, the feed is whole crude. In yet another embodiment the feed is a crude fraction such as from a distillation, vapor-liquid separation, deasphalting, or other separation process. In all embodiments, the feed comprises resid as a component thereof.

In another embodiment, there is a process of producing olefins from a feedstream comprising crude or crude fractions containing resid, the process including a step of hydroprocessing and a step of thermal cracking in a steamcracker that is capable of rejecting the heaviest components of the feedstream and passing substantially only vaporized components, including some resids, into the radiant section of the steam cracker.

In one preferred embodiment, the process further comprises an integrated fractionation step, such as by use of a flash drum to remove asphaltenes and/or fractions boiling above about 1050° F. (about 566° C.) and preferably only those fractions boiling above about 1100° F. (about 593° C.) from the feed prior to passing the feed to the radiant section of the steam cracker unit. Preferably at least one flash drum or flash device, such as a choke, to reduce pressure and cause the conversion of some of the liquids to vapors, is integrated with or in series with the feed to the steam cracker thermal pyrolysis unit. Surprisingly, this can be accomplished with fouling rates that are equal or better than the fouling rates of VGO steam cracker feedstocks.

In one preferred embodiment, hydroprocessing is carried out using at least one of a fixed bed hydrogenation reactor, an ebullating reactor, or a fluidized hydrogenation reactor, prior to the feed stream being fed to a thermal pyrolysis unit. In another embodiment, the hydroprocessing is performed using a vessel or unit that is capable of heating the hydrocarbon feed stream for hydroprocessing, prior to feeding the stream to the steam cracker. For example, the hydrocarbon feedstream may flows through a shell in tube heat exchanger and is heated by a hot media.

In other embodiments, feeds to be hydroprocessed comprise one or more of recycled steam cracker tar, crudes, heavy crudes, or topped crude, and feeds to be steam cracked comprise hydroprocessed recycled steam cracker tar, crudes, heavy crudes, or topped crudes. In still yet another embodiment, a concentrated stream of monocyclic aromatics, such as benzene, toluene, and C8 aromatics, is produced by hydroprocessing crude or crude fraction feedstreams rich in multicyclic aromatics and naphthenes and then steam cracking at high severity.

In some embodiments, the source of hydrogen for the hydroprocessing is from methane, such as from a remote production gas production facility. In another embodiment, the source of hydrogen may be from steam and in another embodiment, the source of hydrogen may be from a product or by-product of a process in a refinery or petrochemical production facility.

Preferred embodiments also are combinations of two or more of the above embodiments, and thus in still another preferred embodiment, feeds such as whole crude, with or without desalting, or the product of a refinery pipestill or a chemical intermediate stream containing asphaltene, such as atmospheric resid or vacuum resid, or steam cracked tar are hydroprocessed using fixed bed hydrogenation reactors or ebullating or fluidized hydrogenation reactors prior to being fed to a thermal pyrolysis unit having a flash pot integrated therewith.

The invention is also directed to a system comprising a hydroprocessing apparatus and a thermal pyrolysis unit and also to a process comprising feeding a resid-containing feed through the system to obtain a product comprising olefins. In a preferred embodiment, the system further comprises a steam reformer for converting methane to hydrogen so as to provide hydrogen to the hydroprocessing apparatus.

It is an object of the invention to provide resid as a feed to the olefins producing steam cracker, and thus enable use of lower quality crude feedstocks in the production of olefins.

These and other objects, features, and advantages will become apparent as reference is made to the following detailed description, preferred embodiments, examples, and appended claims.

DETAILED DESCRIPTION OF THE INVENTION

Figure 1:
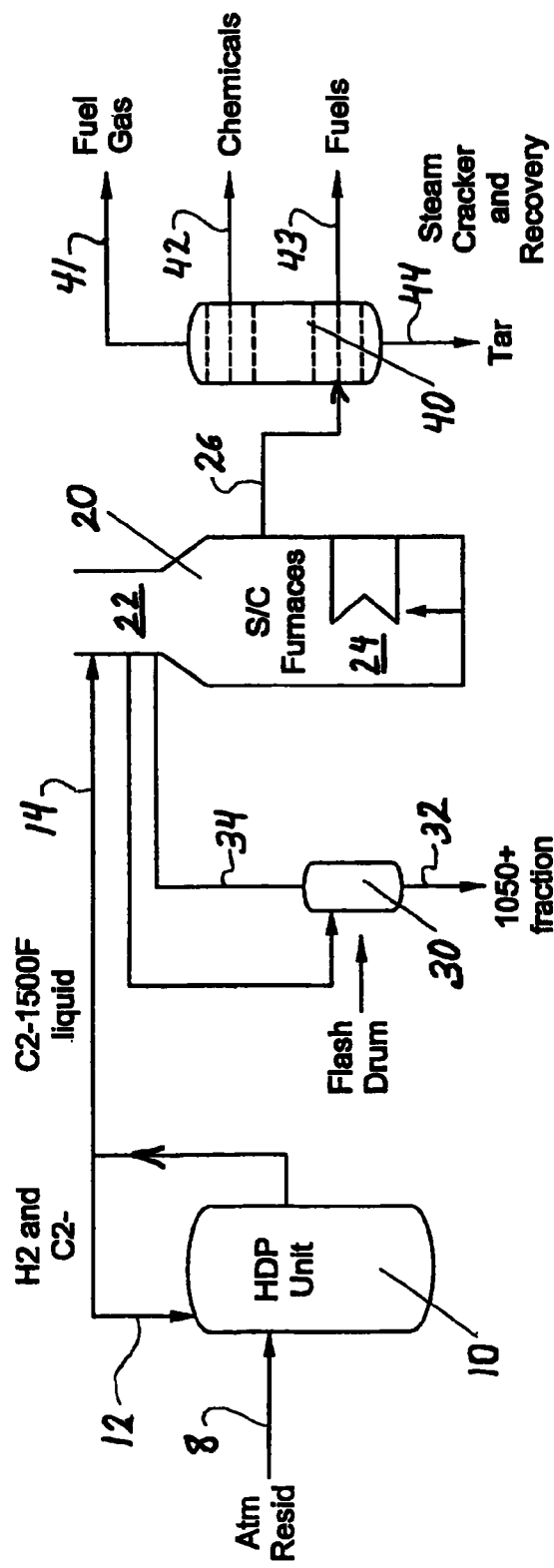
FIGS. 1-5 are process flow diagrams illustrating embodiments of the invention.

In an embodiment, the resid-containing effluent from a resid hydroprocessor, including those resid fractions having a boiling point of less than about 1050° F. (about 566° C.) and preferably those resid fractions boiling point of less than about 1100° F. (about 593° C.), are cracked substantially before pyrolysis, and used as feed for a steam cracker or thermal pyrolysis unit. In the pyrolysis unit, the vaporized fractions are converted to desired products including olefins. The terms thermal pyrolysis unit, pyrolysis unit, steam cracker, and steamcracker are used synonymously herein; all refer to what is conventionally known as a steam cracker, even though steam is optional.

According to the invention a crude or fraction thereof containing resid is hydroprocessed. Typically, resid hydroprocessing according to the present invention may be carried out at a temperature of at least about 600° F. (315° C.), preferably at least about 650° F. (343° C.), more preferably at least about 750° F. (399° C.). Preferably the pressure is at least 1800 psig. According to some embodiments of the processes of the present invention, hydroprocessing may be performed at a temperature of from about 500° F. (260° C.) to about 900° F. (482° C.), preferably from about 650° F. (343° C.) to 900° F. (482° C.), more preferably from about 700° F. (371° C.) to 900° F. (482° C.), more preferably from about 750° F. (399° C.) to about 900° F. (482° C.), and still more preferably from about 750° F. (399° C.) to about 800° F. (427° C.). In some embodiments, the preferred pressure is from about 500 to 10,000 psig, preferably 1000 to 4000 psig may be used, and more preferably from about 1500 to 3000 psig. Preferred liquid hourly space velocity may be from about 0.1 to 5, preferably 0.25 to 1. The hydrogen supply rate (makeup and recycle hydrogen) to the hydroconversion zone may be in the range of from about 500 to about 20,000 standard cubic feet per barrel of hydrocarbon feed, preferably about 2,000 to 5000 standard cubic feet per barrel. The hydroprocessing may be carried out utilizing a single zone or a plurality of hydroprocessing zones, e.g., two or more hydroprocessing zones in parallel or in series. For example, in one embodiment a first zone may comprise a first catalyst that may be designed to accumulate most of the metals removed from the feedstock and a second zone may comprise a second catalyst that can be designed for maximum heteroatom removal and aromatics hydrogenation. In another embodiment, a first catalyst can be designed to accumulate most of the metals removed from the feedstock, a second zone with a second catalyst can be designed for maximum heteroatom removal and a third zone with a third catalyst can be designed to increase aromatics hydrogenation.

According to the present invention, resid hydroprocessing may preferably be carried out at a temperature and pressure that is more severe than conventional hydroprocessing processes are carried out. In one embodiment, the hydroprocessing preferably may be carried out at above 650° F. (343° C.) and up to a temperature that produces substantial hydrocarbon resid cracking during the hydrogenation process, such as about 750° F. (399° C.) to about 800° F. (427° C.). This not only generates a hydrogenated resid component but also cracks or breaks down a substantial portion of the resid component into light fractions that, along with injected steam, help with vaporization and thermal processing of the stream in the steam cracker. The light fractions, along with injected steam, help with conversion, cracking and further vaporization and thermal processing of the resid stream within the steam cracker, such as within the cracker piping.

Resid hydroprocessing includes substantially any process resulting in the hydrogenation of resid and/or resid-containing fractions, and encompasses (but is not limited to) commercially available resid hydroprocessing technologies. Examples of these commercial processes are the H-Oil process, the Chevron RDS, VRDS, OCR, and LC-Fining processes, the HYVAHL process, and the ENI-Snamprogetti EST process. Suitable hydroprocessing processes may include, for example, fixed bed catalyst systems, ebullating bed systems, fluidized bed systems, and/or combinations thereof. Hydroprocessing as used herein also includes some mild cracking some of the 650+ resid components of the hydrocarbon feed, and preferably even some cracking of the boiling fractions from 650° F.+ (343° C.+) up to the about 1050° F.+ (565° C.+) boiling point fractions, and more preferably even up to about the 1100° F.+ (593° C.) fractions.

The hydrogenated feed from the hydroprocessor may then be further fractionated or fed whole to a steam cracker. A combination of separators, flash separators, and/or separation pots may be provided as desired between hydrogenation and cracking. In preferred embodiments, separator processes may be integrated with the heating and cracking process, such as with the steam cracker. e.g., A vapor-liquid separator or separation process may be provided within the convection section of the steam cracker or between the convection section and radiant section of the cracker.

Resid hydroprocessing preferably comprises increasing the hydrogen content of the whole crude or crude fraction containing resid, by at least about 1 wt %, more preferably by 1.5 wt %, and most preferably to a nearly saturated or fully saturated feed stream effluent from the hydroprocessor. It may be preferred in some embodiments that the effluent from the hydroprocessor has hydrogen content in excess of 12.5 wt % and more preferably in excess of 13 wt %. Increasing the hydrogen content of the whole crudes, crude fractions, or other feed stocks may serve to render the hydrogenated product thereof suitable for feeding to a pyrolysis unit for cracking, thereby generating more valuable end products, such as olefins. Thereby, lower cost steam cracker feeds may be used for the production of olefins. Suitable lower value feeds may typically include heavier crudes, those hydrocarbon feedstocks that have high concentrations of resid, high sulfur, high TAN, high aromatics, and/or low hydrogen content. Hydrogenation of the crude or crude fraction and removal of contaminants may facilitate feeding such effluent to a steam cracker system or apparatus that is capable of vaporizing and converting the heaviest components of the feedstream, such as the asphaltenes and the 1100°+ (593° C.) fractions. The remainder of the effluent, including the vaporized resid fraction, e.g., the 1050° F. (565° C.) and lower fractions, or the 1100° F. (593° C.+) and lower fractional components, and even some of the 1400° F. (760° C.) and lower boiling point fractions that is vaporized, is fed into the radiant section of the steam cracker for production of valuable petrochemical products, such as olefins, without undesirable fouling and without resulting in the undesirable production of tar and coke.

Surprisingly, this process may be performed without resulting in uncontrollable equipment fouling or the undesirable production of high yields of tar and resid-containing byproducts. Also surprisingly, the fully hydrogenated crude or resid-containing crude fractions of the present inventive processes may be substantially completely vaporized in the steam cracker and result in increased petrochemical yields. Conversion and vaporization may also be supported by steam assisted flash vaporization. Further, the severe hydrogenation may also greatly reduce production of steam cracker tar.

Surprisingly, this process may be performed without resulting in uncontrollable equipment fouling or the undesirable production of high yields of tar and resid-containing byproducts. Also surprisingly, the fully hydrogenated crude may be substantially completely vaporized in the steam cracker and result in increased petrochemical yields. Conversion and vaporization may also be supported by steam assisted flash vaporization. Further, the severe hydrogenation may also greatly reduce production of steam cracker tar.

The catalyst employed in the typical commercial hydroconversion zone(s) is comprised of material having hydrogenation-dehydrogenation activity together with an amorphous carrier. Exemplary amorphous carriers include alumina, silica-alumina, silica, zirconia, or titania. Hydrogenation-dehydrogenation components of the catalyst preferably comprise at least one hydrogenation component selected from Group VI metals and compounds of Group VI metals and at least one hydrogenation component selected from Group VIII metals and compounds of Group VIII metals. Preferred combinations of hydrogenation components include nickel sulfide with molybdenum sulfide, cobalt sulfide with molybdenum sulfide, cobalt with molybdenum, and nickel with tungsten. The catalyst employed in the invention may also be comprised of a material having hydrogenation-dehydrogenation activity formulated without an amorphous carrier. Exemplary catalysts include Nebula.

In a preferred embodiment, the hydroprocessor effluent selected to be steam cracked comprises a substantial resid fraction boiling from about 700° F. (371° C.) to about 900° F. (482° C.). In another preferred embodiment, if the hydroprocessor effluent contains resid, it may be first treated to remove a portion of the resid, such as the asphaltenes, prior to feeding the treated and hydrogenated resid-containing material into the convection section or the radiant section of the thermal pyrolysis unit (steam cracker). Preferred methods of removing the undesirable resid portions are discussed below.

In another embodiment of the invention, a resid-containing crude or fraction thereof is treated by a process including a first step of hydroprocessing and a second step of thermal cracking. It is one of the advantages of the present invention that, in embodiments, material comprising resid may be fed directly into the steam cracker to be heated in the convection section of the steam cracker.

Crude, as used herein, means whole crude oil as it issues from a wellhead, production field facility, transportation facility, or other initial field processing facility, optionally including crude that has been processed by a step of desalting, treating, and/or other steps as may be necessary to render it acceptable for conventional distillation in a refinery. Crude as used herein is presumed to contain resid.

Crude fractions are typically obtained from the refinery pipestill. Although any crude fraction obtained from the refinery pipestill may be useful in the present invention, a significant advantage offered by the present invention is that crude or crude fractions still containing all or a portion of the original resid present in the whole crude obtained from the wellhead may be hydroprocessed and subsequently used as feed for a steam cracker. In one embodiment, the crude or other feedstock to the hydroprocessing unit may comprise at least about 1 wt % resid, preferably at least about 5 wt % resid, and more preferably at least about 10 wt % resid.

Resid as used herein refers to the complex mixture of heavy petroleum compounds otherwise known in the art as residuum or residual. Atmospheric resid is the bottoms product produced in atmospheric distillation when the endpoint of the heaviest distilled product is nominally 650° F. (343° C.), and is referred to as 650° F.+ (343° C.+) resid. Vacuum resid is the bottoms product from a column under vacuum when the heaviest distilled product is nominally 1050° F. (566° C.), and is referred to as 1050° F.+ (566° C.+) resid. (The term "nominally" means here that reasonable experts may disagree on the exact cut point for these terms, but probably by no more than +/−50° F. or at most +/−100° F.) This 1050° F.+ (566° C.+) portion contains asphaltenes, which traditionally are considered to be an anathema to the steam cracker, resulting in corrosion and fouling of the apparatus. The term "resid" as used herein means the 650° F.+ (343° C.+) resid and 1050° F.+ (565° C.+) resid unless otherwise specified; note that 650° F.+ resid comprises 1050° F.+ resid. According to this invention, at least a portion of the 650° F.+ resid, up to at least the 1050° F.+ boiling point fraction, is vaporized, such as during (i) hydroprocessing, (ii) when combined with steam, and/or (iii) when the pressure is reduced or flashed between the hydroprocessing unit and steam cracking.

Resid also typically contains a high proportion of undesirable impurities such as sulfur and nitrogen, as well as high molecular weight ($C_{12}$+) naphthenic acids (measured in terms of TAN according to ASTM D-664). Yet another advantage of the present invention is that feeds high in one or more of these impurities may be readily processed. As an example of one specific species of impurities, a large amount of sulfur may be tied up in multi-ring heterocycles. By hydrotreating resid containing such species, not only is the sulfur removed as $H_2S$, but the heterocyclic rings are broken up to yield a significant amount of monocyclic aromatic species, which are often valuable commodities by themselves and are also a preferred feed to steam crackers.

The term "hydroprocessing" as used herein is defined to include those processes comprising processing a hydrocarbon feed in the presence of hydrogen to hydrogenate or otherwise cause hydrogen to react with at least a portion of the feed. This includes, but is not limited to, a process comprising the step of heating a resid-containing hydrocarbon feed stream in a hydroprocessing step in the presence of hydrogen, preferably also under pressure. Hydroprocessing may also include but is not limited to the process known as hydrofining, hydrotreating, hydrodesulfurization (HDS), hydrodenitrogenation (HDN), hydrodeoxygenation (HDO), and hydrocracking.

The term "steam cracker" as used herein is also known more generally as thermal pyrolysis; both terms are per se well-known in the art. Steam, although optional, is typically added for one or more reasons, such as to reduce hydrocarbon partial pressure, to control residence time, and to minimize coke formation. In preferred embodiments the steam may be superheated, such as in the convection section of the pyrolysis unit, and/or the steam may be sour or treated process steam.

It is conventional to desalt prior to passing the feed to the pipestill. When resid from the pipestill is meant to be hydroprocessed, the crude oil feed to the refinery is often double desalted. Desalting typically removes metal salts, such as NaCl. However, the desalted crude and crude fractions may still contain relatively high concentrations of one or more impurities such as naphthenic acids, sulfur, and/or nitrogen. Another advantage of the present invention is that crude and crude fractions containing one or more of such naphthenic acid, sulfur, and nitrogen impurities may be readily processed.

In a preferred embodiment, wherein the feed comprises crude or atmospheric resid that contain appreciable amounts of 1050° F.+ resides, e.g., 10 wt % or more of resid, or 20 wt % or more of resid, the resid-containing feed, after hydroprocessing, may be passed into the convection section of a pyrolysis unit, where it is preheated. Then the heated feed may be passed to a pressure reduction device or flash drum, which may be optionally integrated with the pyrolysis unit, to drop out the heaviest fraction (e.g., substantially the asphaltenes). The terms "flash drum", "flash pot", "knock-out drum" and knock-out pot" are used interchangeably herein; they are per se well-known in the art, meaning generally, a vessel or system to separate a liquid phase from a vapor phase. The term "flash" means generally to precipitate a phase change for at least a portion of the material in the vessel from liquid to vapor, via a reduction in pressure and/or an increase in temperature. The addition of steam may further assist flash separation by reducing the hydrocarbon partial pressure, assist in conversion and vaporization of the 750° F.+ (399° C.) to 1050° F.+ (566° C.+) (preferably even a substantial portion of the 1100° F.+ (593° C.+)) resid fractions, and prevent fouling.

In a more preferred embodiment the material is treated by visbreaking and further mild thermal cracking to increase the proportion of vapor phase at the expense of bottoms product. In some of the separation processes, such as in high pressure separators and/or the flash separators, the feed material may be separated into a bottom, substantially liquid phase fraction and an overhead, substantially vapor phase fraction. The vapor fraction may also contain components derived from the resid fraction. The bottoms or liquid phase may include a resid fraction therein. Preferably, both the bottoms fraction and the vapor fraction effluents each contain components derived from the resid fraction, though the composition of the resid fraction of the bottoms effluent will be different from the vapor effluent. Thereby, each of the vapor steam and the bottoms stream may be steam cracked.

The preferred flash drums or vapor liquid separation devices, and their integration with pyrolysis units have previously been described in U.S. Patent Application Publication Nos. 2004/0004022, 20040004027, and 2004/0004028, and more recently in U.S. application Ser. No. 11/068,615 filed Feb. 28, 2005, Ser, No. 10/851,486 filed May 21, 2004, Ser. No. 10/851,546 filed on May 21, 2004, Ser. No. 10/851,878 filed May 21, 2004, Ser. No. 10/851,494 filed on May 21, 2004, Ser. No. 10/851,487 filed May 21, 2004, Ser. No. 10/851,434 filed May 21, 2004, Ser. No. 10/851,495 filed May 21, 2004, Ser. No. 10/851,730 filed May 21, 2004, Ser. No. 10/851,500 filed May 21, 2004, Ser. No. 11/134,148 filed May 20, 2005, Ser. No. 10/975,703 filed Oct. 28, 2004, Ser. No. 10/891,795 filed Jul. 14, 2004, Ser. No. 10/891,981 filed Jul. 14, 2004, Ser. No. 10/893,716 filed Jul. 16, 2004, Ser. No. 11/009,661 filed Dec. 10, 2004, Ser. No. 11/177,076 filed Jul. 8, 2005; and Ser. No. 11/231,490, filed Sep. 20, 2005. Another preferred apparatus effective as a flash pot for purposes of the present invention is described in U.S. Pat. No. 6,632,351 as a "vapor/liquid separator".

In the optional flash drum process of the present invention, the flash drum preferably operates at a temperature of between about 800° F. (about 425° C.) and about 850° F. (about 455° C.), but also typically not over about 900° F. (about 482° C.). Passing material through the flash drum to obtain an overhead vapor and liquid bottoms is referred to herein as "flashing" and may further facilitate substantially complete vaporization of the 650° F.+ (343° C.) resids, except in some cases for impurities such as the asphaltenes.

Other than a flash drum or separation vessel, the pressure may be reduced substantially in-line through a pressure reduction device, such as one or more chokes. The pressure reduction is performed between the hydroprocessing unit and steam cracking in the steam cracker. For example, the reduction may be performed substantially within the convection section of the steam cracker.

Crude or resid-containing fraction thereof, particularly atmospheric resid, vacuum resid, or any asphaltene-containing refinery or chemical intermediate stream may also be a preferred feed to the hydroprocessor for the inventive process. When the feed comprises greater than about 0.1 wt %, or preferably greater than about 5.0 wt % asphaltenes, a flash pot or pressure reducer may be advantageously used to remove at least a portion of the asphaltenes prior to entering the radiant section of the pyrolysis unit. Preferably the flash device may be integrated with the pyrolysis unit, as discussed above, so that the feed is preheated in the convection section of the pyrolysis unit prior to entering the flash device. In the alternative, it may be a separate unit so that removal of asphaltene occurs substantially prior to the feed entering the pyrolysis unit.

Preferred feeds include a hydrocarbon stream having a high concentration of polycyclic aromatics, particularly those high in heterocyclic rings, tar, and topped crude. "Topped crude" may be defined as the cut roughly having a boiling point of from about 500-600° F. (260-315° C.) and higher cut, but below temperatures where significant cracking occurs, e.g., about 650° F.-700° F. (340-370° C.); often topped crude is used as a synonym for atmospheric resid). This preferred feed may or may not contain appreciable amounts of resid.

Upgrading of crude and crude fractions containing resid and also an appreciable amount of polycyclic aromatics, particularly those high in heterocyclic rings, is one of the particular advantages provided by the present invention. An example is VGO (Vacuum Gas Oil) upgrading.

Hydroprocessing alone provides for some breaking of the ring structures of the aromatic heterocycles, however, a very large portion of the polycyclic ring structure is left intact. Steam cracking alone provides for a product comprising significant yields of fuel oil, tar, and non-aromatic SCN (steam cracked naphtha) in addition to the desired ethylene, propylene, butanes, $C_5$ olefins and dienes, and single-ring aromatic products.

However, in a process according to the present invention, hydroprocessing followed by steam cracking simultaneously reduces the yields of fuel oil, tar, and non-aromatic SCN while increasing the yield of the aforementioned desirable petrochemical products. In addition to resid, resid-derived VGO, feeds comprising crudes, Light Catalytic Cycle Oil (LCCO or distillate from a catalytic cracker), coker gasoils, FCC cycle oils, steam cracker tar and lube extracts are preferred feeds to arrive at a product rich in the aforementioned preferred aromatics. Further, increasing the severity and preferably even the residence time, in hydroprocessing as compared to conventional hydroprocessing and steam cracking at temperatures of less than 650° F., further improves the conversion of the resid components to vaporized components in the radiant section of the steam cracker. The addition of steam and preferably even flashing the hydrogenated effluent through a pressure drop may also improve vaporization of the resid fractions. Thereby, improved yields of olefin and other more valuable light products may be realized.

Thus, hydroprocessing feedstocks rich in polynuclear aromatics, particularly those high in heterocyclic rings, are a preferred feedstock for producing light olefins and single-ring aromatics in a steam cracker. This is surprising. Polynuclear aromatics comprise both aromatic and napthenic ring structures. Without wishing to be bound by theory, such feedstocks, when fed to a steam cracker, undergo hydrogen transfer reactions, whereby naphthenic rings are converted to aromatic rings. The hydrogen atoms removed from the naphthenes typically emerge from the steam cracker as C—H bonds in light paraffin molecules such as methane, ethane, and propane. In mole %, methane is the dominant paraffin produced in steam cracking. Thus, feedstocks rich in polynuclear aromatics, particularly those high in heterocyclic rings, tend to produce high yields of methane and tar upon steam cracking. The present inventors have surprisingly discovered that high severity hydroprocessing of these feedstreams results in the production of a high quality steam cracker feedstock.

Another surprising aspect of the invention involves the API gravity of the steam cracker feedstock. It is known that steam cracker product quality improves with increasing API gravity of the feed. The present inventors have surprisingly discovered that feedstocks rich in high boiling, polynuclear naphthenes and partially saturated polynuclear aromatics, which tend to have lower API gravity, can be preferred feedstocks to a steam cracker.

In a preferred embodiment, increasing the severity of the steam cracker using at least one of the aforementioned resid-containing feeds, increases the yield of benzene toluene and xylenes. Reaction Severity is a term known per se in the art and can be measured, for instance, by the ratio of propylene versus methane exiting the steam cracker. The present invention may be further improved by hydrotreating the resid-containing feeds at a higher severity than is typical of conventional hydroprocessing, and preferably for a shorter duration of time than is typical of traditional hydroprocessing.

Preferred embodiments and processes may comprise one or more of the following features or aspects:

Olefins may be produced from a process comprising the steps of obtaining an effluent from a resid hydroprocessing unit and steam cracking substantially all of the effluent to obtain a product comprising olefins, wherein the effluent comprises 650° F.+ (343° C.+) resid. The effluent from the hydroprocessing unit is hydrogenated and has been subjected to at least some mild cracking in the hydroprocessing unit, preferably substantial cracking, and more particularly of the resid fractions, thereby increasing the concentration of light ends within the hydrogenated effluent. Preferably, the hydrogen concentration of the effluent from the resid hydroprocessing unit comprises at least about 1 wt % more hydrogen than the hydrogen concentration of the hydrocarbon feed coming into the resid hydroprocessing unit. Additionally, steam is added to the effluent from the resid hydroprocessing unit prior to cracking the effluent, and more preferably, the effluent is subjected to a pressure drop prior to cracking in the steam cracker. Preferably, the pressure drop is at least half of the pressure in the hydroprocessing unit, and may be done in a single step or multiple steps. In a preferred process, there is substantially no removal or separation of a resid fraction from the effluent prior to feeding the effluent into a radiant section of a steam cracker. The preferred exception is to remove asphaltenes and unconvertible resids having a boiling point in excess of 1100° F. (593° C.). The process further comprises the step of feeding the effluent from the hydroprocessing unit into a steam cracking unit to produce a steam cracker product comprising olefins. The steam cracker product comprising olefins is separated in a separate process to recover or obtain an olefin and/or aromatic products.

The inventive processes also comprise combining the crude or crude fraction containing resid with hydrogen or a source for hydrogen, in the hydroprocessing unit. Preferred hydrotreating pressures, temperature ranges, and sources for hydrogen are discussed in more detail above. Steam is added to at least one of the hydroprocessing unit and the effluent from the hydroprocessing unit.

In another preferred process, olefins may be obtained from a process including the steps of (i) hydroprocessing feedstock comprising crude or crude fraction comprising resid to obtain hydroprocessed crude or hydroprocessed crude fraction; and (ii) steam cracking the hydroprocessed feedstock, including the resid fraction of the feedstock, to obtain a product comprising olefins. Preferably, the hydroprocessed feedstock is subjected to a pressure reduction or flashing, to further vaporize the hydroprocessed resid components. Flashing may be performed such as by using a flash drum/pot, a high pressure separator, an inline choke, an orifice plate, or any other suitable reduction device. Such processes may also comprise the step of separating the hydroprocessed crude or hydroprocessed crude fraction to obtain a non-vaporizable resid-containing bottoms fraction and a vapor fraction, then steam cracking at least the vapor fraction to obtain a product comprising olefins. A majority by weight of the bottoms fraction comprises resid having a boiling point of at least 900° F. (482° C.). Optionally, the bottoms fraction, including asphaltenes and/or non-vaporized resid components, may be recycled to the hydroprocessor for further hydroprocessing, and/or they may be sent to other units, such as a catalytic cracking unit, for further processing. The step of separating may comprise using a separator, such as a flash drum, high pressure vapor-liquid separator, visbreaker, and/or other separation unit. Preferably the separation unit operates in the section of the separation vessel where phase separation and settling occurs, at a pressure of less than half of the effluent discharge pressure from the hydroprocessing unit. Preferably and typically, the separator pressure may be reduced as compared to the pressure of the effluent immediately from the hydroprocessor unit, to facilitate an increased flashing and vaporizing effect. In other embodiments of the process, the hydroprocessed crude or hydroprocessed crude fraction may be separated to obtain a resid containing bottoms fraction and a vapor fraction. The resid containing bottoms fraction and/or the vapor fraction may be steam cracked, either in the same or separate pyrolysis units.

The step of separating also preferably comprises the process of flash separating the hydroprocessed crude or hydroprocessed crude fraction. The resid containing bottoms fraction may be separated into a flash separated vapor stream and a flash separated liquid stream, and the flash separated vapor stream may be steam cracked to produce an olefin containing product. Where the separator is a first high pressure separator, the step of separating using a high pressure separator may further comprise reducing the temperature of the vapor fraction from the from the first high pressure separator and sending the reduced temperature vapor fraction from the first high pressure separator to a second high pressure separator and separating a second vapor fraction from a second bottoms fraction and steam cracking at least the second vapor fraction. This process is demonstrated in more detail below. In alternative process embodiments, the bottoms fraction from the high pressure separator may be fed to a flash separation process where the bottoms fraction from the high pressure separation is further separated by the flash separation to a flash separated vapor fraction and a flash separated bottoms fraction. At least one of hydrogen and steam may optionally be added to the bottoms fraction from the high pressure separator either prior to flash separation or during flash separation. Optionally, the second bottoms fraction may be processed in a hydroprocessing unit and thereafter steam cracked.

In some other preferred process embodiments, the step of separating comprises at least one step of: (i) distillation; (ii) flashing; (iii) membrane separation; (iv) solvent deasphalting; (v) gravitational settling; and (v) a combination thereof. In still other processes according to this invention the step of hydroprocessing comprises hydrogenating the feed using at least one of: (i) a fixed bed catalyst system; (ii) an ebullating bed system; (iii) a fluidized bed system; and (iv) a combination thereof.

Inventive processes also include a step of separating the hydroprocessed crude or hydroprocessed crude fraction to obtain a product fraction and then steam cracking the product fraction to obtain a final product comprising olefins. The step of separating may comprise at least one step of: (i) separating by distillation; (ii) separating by flashing; and (iii) separating by gravitational settling.

According to any of the inventive processes, the crude or crude fraction may contain at least one impurity selected from: (i) sulfur in the amount of greater than 1 wt %, more preferably greater than 3 wt %, based on the weight of the feed; (ii) resid in the amount of greater than 5 wt %, preferably greater than 10 wt %, more preferably greater than 20 wt %, still more preferably greater than 30 wt %, based on the weight of the feed; and (iii) naphthenic acids as measured by a TAN of $\geq 1.0$, preferably $\geq 1.5$, more preferably $\geq 2.0$, still more preferably $\geq 2.5$ mg KOH/g oil, yet still more preferably $\geq 3.0$ mg KOH/g oil (ASTM D-664). Hydroprocessing preferably also saturates at least 20 wt % of the aromatic species in the feed. In some processes, the product stream from the steam cracker may also comprise tar and optionally, the tar may be recycled to the crude feed into the hydroprocessing unit.

The invention also includes a hydroprocessing and steam cracker system for making olefins from a feed including at least one of crude and crude fractions comprising resid having a boiling point of at least 650° F. (343° C.). The system comprises, in series, and in the following order: (i) at least one hydroprocessing apparatus; (ii) at least one pressure reducer; and (iii) at least one steam cracker; and (iv) at least one steam cracker product recovery apparatus; wherein the steam cracker receives at least a portion of the 650° F.+ (343° C.+) resid from the feed. The system may also include a flash pot/drum that is preferably heat integrated with the steam cracker. In preferred embodiments, the system also includes at least one stream reformer in series with and prior to at least one of the hydroprocessing apparatuses, wherein the steam reformer is configured so as to provide hydrogen to the hydroprocessing apparatus.

Other embodiments of the inventive processes include a process for making olefins from a hydrocarbon feed comprising feeding the feed through a hydroprocessing system and steam cracker system, the improvement comprising feeding a resid-containing material into a hydroprocessing apparatus and hydroprocessing and cracking at least a portion of the resid-containing material in the hydroprocessing apparatus, and thereafter feeding at least a portion of the hydroprocessed and cracked resid-containing material to a steam cracker apparatus in the steam cracker system.

Inventive processes also include a process for producing olefins, the process comprising: (i) hydrogenating a hydrocarbon feedstock comprising at least five wt % of resid to form a hydrogenated resid-containing feed; (ii) cracking at least a portion of the hydrocarbon feedstock during or subsequent to the step of hydrogenating the hydrocarbon feedstock; (iii) thereafter feeding the hydrogenated resid-containing feed to a steam cracker, preferably to the radiant section of the steam cracker; and (iv) steam cracking the hydrogenated resid-containing feed in the radiant section of the steam cracker to obtain a steam cracked product comprising olefins. Preferably, the hydrocarbon feedstock comprises at least one of (i) atmospheric distillation bottoms; (ii) vacuum distillation bottoms; (iii) undistilled crude; and (iv) mixtures thereof.

In other aspects, the invention comprises a process for hydrogenating a resid-containing hydrocarbon feedstock to produce a hydrogenated resid-containing feedstock for a hydrocracker, wherein the process comprising the steps of: (i) feeding a resid-containing hydrocarbon feed-stock to a hydroprocessing unit; (ii) combining the resid-containing hydrocarbon feed-stock with a hydrogen-containing component to produce a combined feed material for the hydroprocessing unit; and (iii) processing the combined feed material in the hydroprocessing unit at a temperature of from 700° F. (371° C.) to 900° F. (482° C.) to produce a hydrogenated resid-containing hydrocracker feedstock material. The process may also include the steps of: (i) feeding the hydrogenated resid-containing material of step iii to a steam cracker; and/or (ii) processing the hydrogenated resid-containing material in the steam cracker to produce an olefin product. The step of processing the combined hydrogen and feed material in the hydroprocessing unit preferably comprises pressurizing the hydroprocessing unit to a pressure of at least 1000 psig, and more preferably to at least 1500 psig, up to a pressure of about 10,000 psig, or more preferably only up to about 5000 psig, and still more preferably only up to a pressure of about 4000 psig. The step of processing the combined feed material in the hydroprocessing unit preferably comprises heating the hydroprocessing unit to a temperature within a temperature range of from about 600° F. (315° C.) to about 900° F. (482° C.), or more preferably, to a temperature of from about 700° F. (371° C.) to about 800° F. (427° C.), still more preferably to a temperature of from about 750° F. (399° C.) to about 800° F. (427° C.).

EXAMPLES

The following examples are meant to illustrate the present invention and inventive processes, and provide where appropriate, a comparison with other methods, including the products produced thereby. Numerous modifications and variations are possible and it is to be understood that within the scope of the appended claims, the invention may be practiced otherwise than as specifically described herein.

In the figures that follow, "HDP" is a hydroprocessing apparatus, "HPS" is a high pressure separation device (e.g., a letdown drum), "Flash" is a flash drum, "Steam Cracker" is a thermal pyrolysis apparatus, and "Steam Cracker Product Recovery" is an apparatus which comprises one or typically several separation steps, e.g., distillation columns. All of these apparatus taken separately may be conventional apparatus and are separately known in the art per se.

FIG. 1 is a process flow diagram illustrating an exemplary embodiment of the invention where a resid-containing feed 8 is hydroprocessed and then passed to a steam cracker 20 to obtain various products 41-44, including olefins.

In the process illustrated by FIG. 1, atmospheric resid 8 is passed to a conventional hydroprocessor (HDP) 10, such as a fixed bed hydroprocessor. Numerous HDP units are commercially available, varying by inter alia catalyst and configuration, such as from ExxonMobil. The design details of the HDP are not per se the subject of the present invention. Processing conditions typically may be readily determined by one of ordinary skill in the art. Aromatics recovery, discussed elsewhere herein, will be largely effected by conditions chosen in the HDP and also in the steam cracker(s).

The hydrogenated effluent from the HDP 10 is then passed to one or more separation devices (not shown) to recover hydrogen, let down the pressure, and optionally reduce the temperature. The stream 12 comprising hydrogen and light carbon products, e.g., $C_2$ and lower boiling points, may be recycled to the HDP. The stream 14 comprising hydrogenated products from $C_2$ boiling range ($C_{2+}$) and higher (e.g., up to 1500° F.) is passed to the steam cracker 20. Note that in many cases the light, recycle stream 12 may contain $H_2S$, which is preferably removed, such as by membrane(s), absorbent(s), and the like, prior to reentering the HDP unit. A bottoms stream from the HPS (not shown), if present, may be recycled or passed to a vacuum or flash drum to further reduce the pressure.

In the case where the steam cracker feed 14 still contains asphaltenes, these may be advantageously removed prior to entering the lower radiant section 24 of the steam cracker. Removal of the asphaltenes is discussed more fully above. Although not shown in detail in FIG. 1, the hydrogenated $C_{2+}$ stream 14 is preferably preheated in the convection section 22 of the steam cracker 20 prior to being passed to a flash drum 30, wherein (nominally) 1050° F.+ (565° C.) resid, including asphaltenes, may be removed as bottoms product 32 from the flash drum 30. The asphaltene-free vapor 34, including vaporized resids, is passed back to the convection section 22. When condensed, the vapor 34 produces a liquid comprising resid. The apparatus schematic designated "S/C furnaces" in FIG. 1 is the conventional illustration of a steam cracker furnace 20, the details of which, again, are not the subject of the present invention except for the integration of the flash drum 30, which has been described in the references discussed elsewhere herein.

The effluent product 26 of the steam cracker may be sent to the steam cracker product recovery section 40, where various products 41-44 may be recovered by separation, typically by distillation, as shown in FIG. 1. The "chemicals" stream 42 comprises ethylene, propylene, and butenes. The separations are conventional and not the subject of the present invention.

Certain variations will immediately become apparent to one of ordinary skill in the art. As an example, one or more of the flash drums may be exchanged with other separation devices, such as membranes or vacuum towers and integration with the steam cracker, while a preferred embodiment, is optional. Removal of the asphaltenes, however, is highly preferred prior to the radiant section of the thermal pyrolysis unit (steam cracker). Membranes are particularly useful to separate, for instance, polar from non-polar species (for instance, prior to the HDP unit) or aromatic from non-aromatic species (for instance, after the second HPS unit in FIG. 1 and prior to the steam cracker, passing non-aromatics to the steam cracker and recycling aromatics to the first HPS unit).

Figure 2:
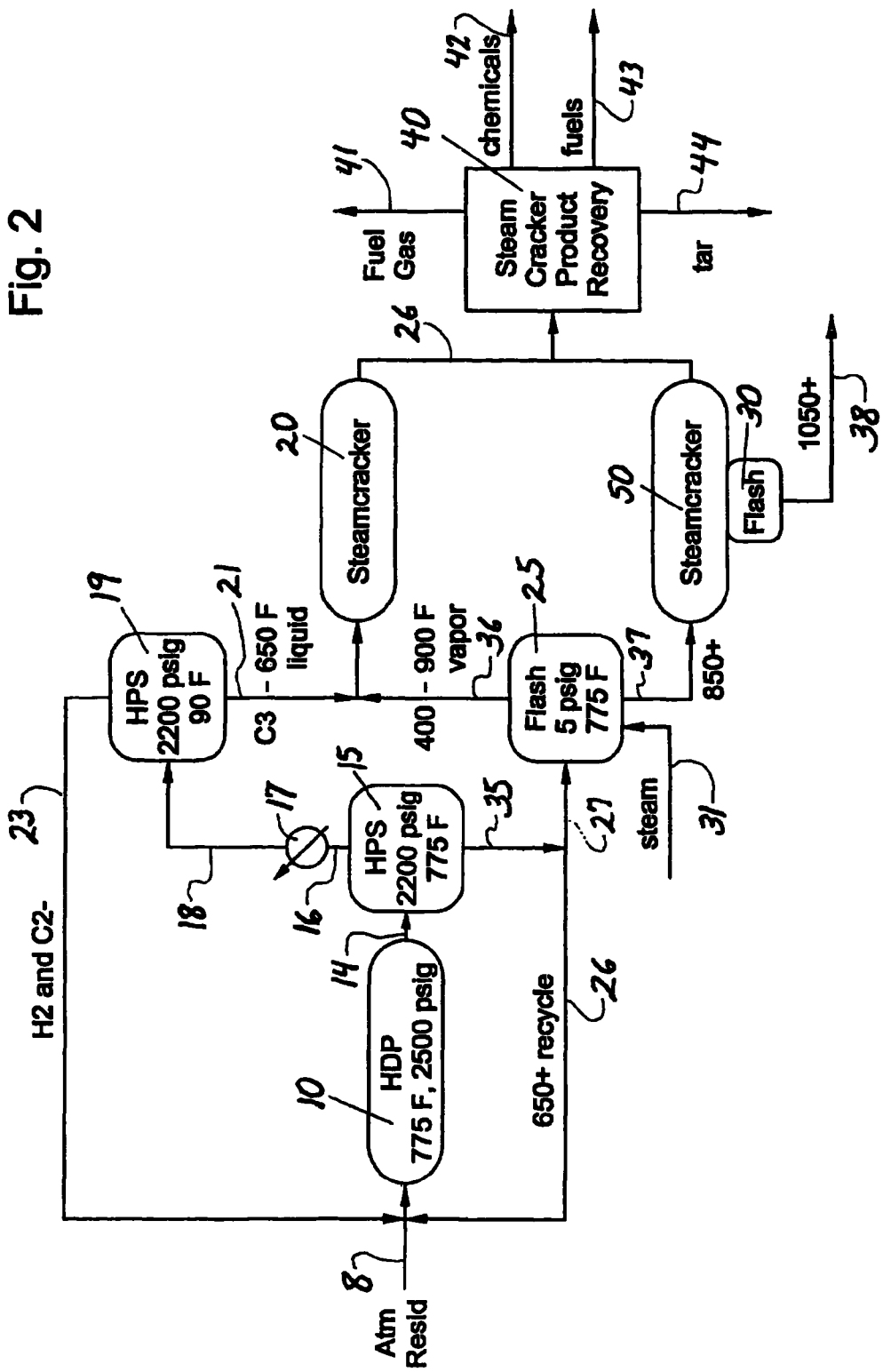

FIG. 2 is a process flow diagram illustrating an exemplary embodiment of the invention where a resid-containing feed 8 is hydroprocessed and then passed to a steam cracker 20 to obtain various products 41-44, including olefins.

In the process illustrated by FIG. 2, atmospheric resid 8 is passed to a conventional hydroprocessor (HDP) 10, such as a fixed bed hydroprocessor. Again, the design details of the HDP are not per se the subject of the present invention. Illustrative processing conditions are shown in FIG. 2 for the HDP 10 step. However as may be recognized by one of ordinary skill in the art, these may vary and may be determined by routine experimentation.

The hydrogenated feed 14 is passed to a high pressure separator 15 operating at conditions such as specified in FIG. 2, which may, again, vary and be determined by one of ordinary skill in the art by routine experimentation, depending on the feed and the operating conditions of the other apparatus in the system shown. The overheads 16, passing through a heat exchanger 17 illustrated in the conventional manner of a circle with arrow passing through, consists of distillate boiling at about 650° F. and below. The cooled overheads or vapor 18 may then be sent to the second HPS 19 shown in FIG. 2, separating the stream at about the 90° F. point, as shown, to yield a bottoms 21 comprising C3 material and higher carbon numbers (including naphtha and heavy distillate), which is passed to the top steam cracker 20 shown in FIG. 2, and an overheads 23 comprising hydrogen, methane, ethylene, and $H_2S$, with the overheads being recycled, preferably after removal of $H_2S$ by, for instance, membrane, absorbent, and the like.

The bottoms 35 from the first HPS 15 comprises the resid-containing material boiling above about 650° F. It may be recycled 26 or passed 27 to a flash drum 25. In practice typically a portion 26 (such as 10 to 90 wt % or 40 to 60 wt %) will be recycled and a portion 27 (such as 10 to 90 wt % or 40 to 60 wt %) will be sent to the flash drum 25. Steam 31 may optionally be added to the flash drum 25, acting inter alia as a diluent. As with all the apparatus conditions shown in the figures of the invention, the operating conditions shown in the flash drum 25 of FIG. 2 are merely representative and the actual conditions may vary in practice and can be determined by routine experimentation by the ordinary skilled artisan.

The flash drum 25, as previously stated elsewhere above, is intended to provide a physical separation of liquid and vapor at the conditions specified. The vapor 36 from the flash drum 25 may be sent directly to the steam cracker 20. The bottoms 37 may be recycled (not shown), removed from the system (not shown), or, as shown in the figure, passed to a steam cracker 50 with an integrated flash drum 30. In this exemplary preferred embodiment, the 850° F.+ bottoms 37 from the first flash drum 25, comprising resid and Vacuum Gas Oil (VGO) is preheated in convection section (not shown) of the bottom steam cracker 50 shown in FIG. 2, and then the vapor from the integrated flash drum 30 is introduced into the radiant section (not shown) of the steam cracker 50, where it is cracked. The bottoms 38 from the integrated flash drum 30, consisting of (in the present preferred embodiment) 1050° F.+ cut, comprises asphaltenes.

The product of each of steam cracker 20 and 50 is sent to the steam cracker product recovery section 40, where various products 41-44 may be recovered by separation, typically by distillation, as shown in FIG. 2. The "chemicals" stream 42 comprises ethylene, propylene, and butenes. Each steam cracker 20, 50 may be integrated with its own product recovery apparatus (not shown) or a single product recovery unit 40 may handle both steam cracker effluents.

Certain variations will immediately become apparent to one of ordinary skill in the art. As an example, one or more of the flash drums may be exchanged with other separation devices, such as membranes or vacuum towers. Membranes are particularly useful to separate, for instance, polar from non-polar species (for instance, prior to the HDP unit 10) or aromatic from non-aromatic species (for instance, after the second HPS unit 19 in FIG. 2 and prior to the steam cracker 20, passing non-aromatics to the steam cracker 20 and recycling aromatics to the first HPS unit 15).

Figure 3:
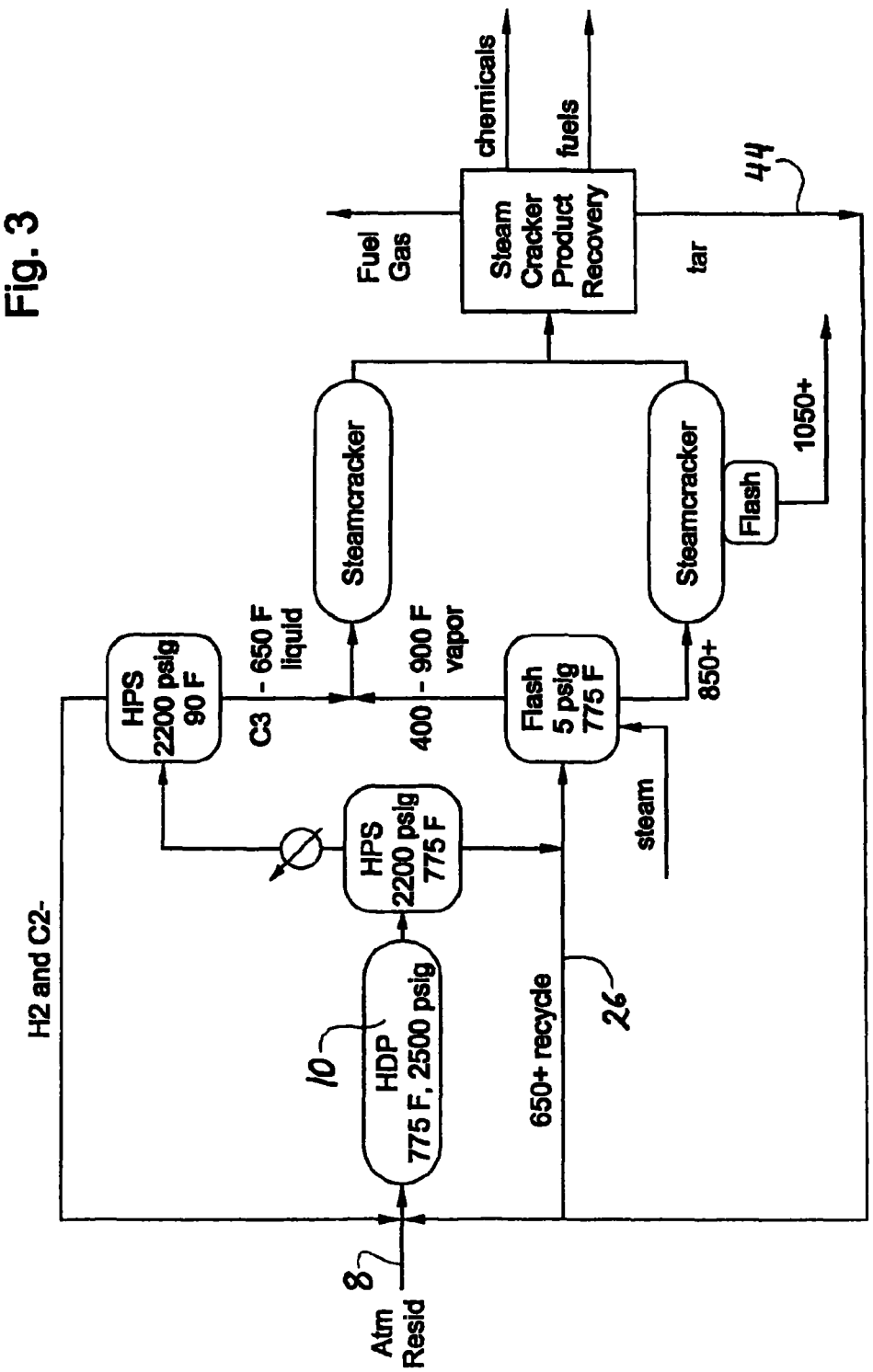

FIG. 3 illustrates another exemplary embodiment of the invention. FIG. 3 is similar to FIG. 2 except in FIG. 3, tar 44 from the product recovery unit 40, heated to a temperature of from about 100° C. to about 200° C. to maintain fluidity, and now containing substantially no metals, and comprising very little asphaltenes and other 1050° F.+ materials, is passed to the HDP 10. In one embodiment, the tar 44 is preferably being diluted with one or more of the 650° F.+ (343° C.+) recycle 26 and/or feed 8, or portion of one or both of these materials 26 and/or 8.

Figure 4:
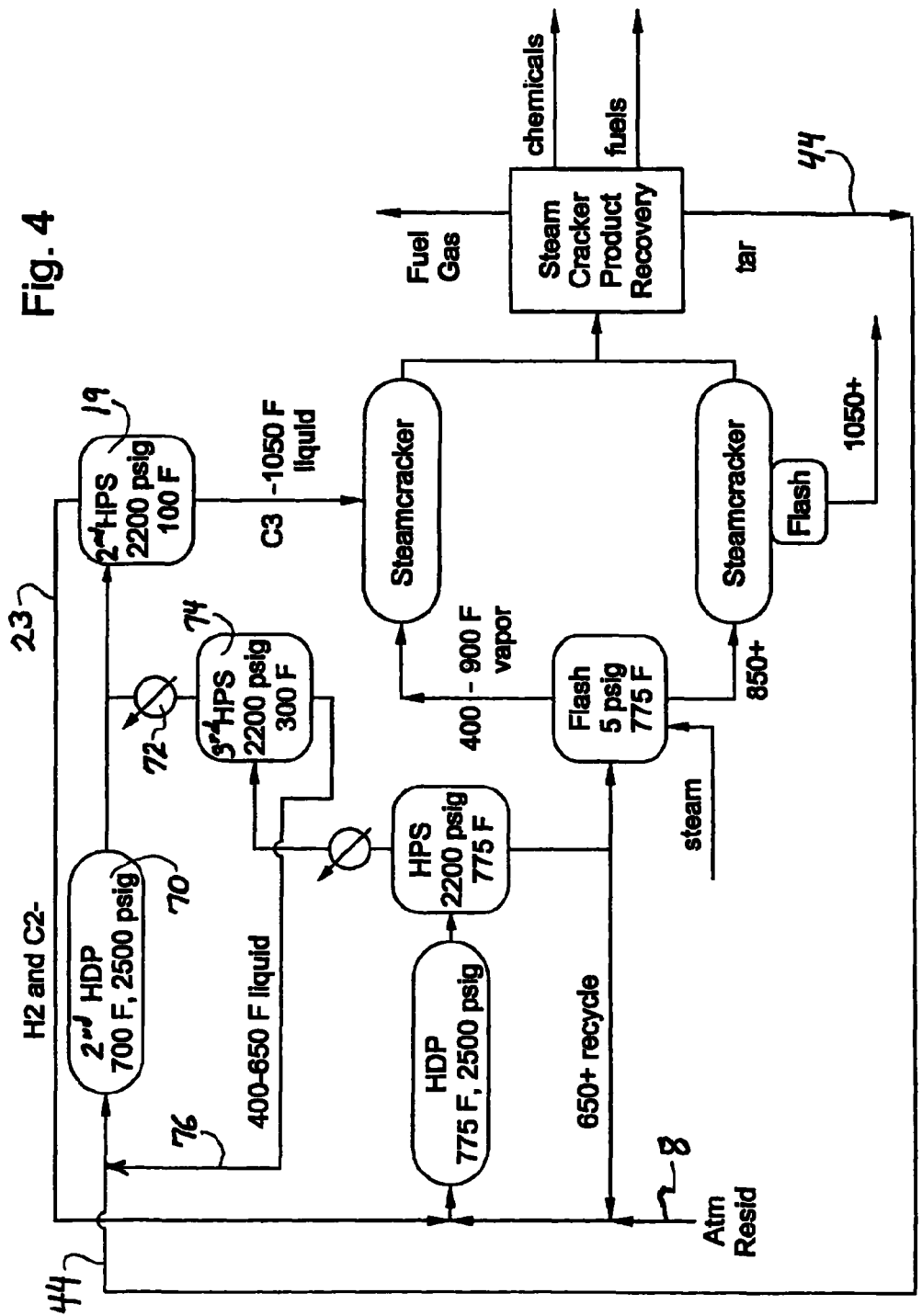

FIG. 4 illustrates still another preferred embodiment of the invention. FIG. 4 is similar to FIG. 3, except a second HDP unit 70, a second heat exchanger 72, and a third HPS unit 74 is provided. As shown in FIG. 3, tar 44 is recycled to the second HDP unit 70, and optionally diluted with material 76 from the second HPS unit 74 (e.g., 400-650° F. liquid). In another variation (not shown) a portion of the tar 44 can be mixed with the atmospheric resid 8 and a portion mixed with the bottoms product 23 of the second HPS unit 19.

Figure 5:
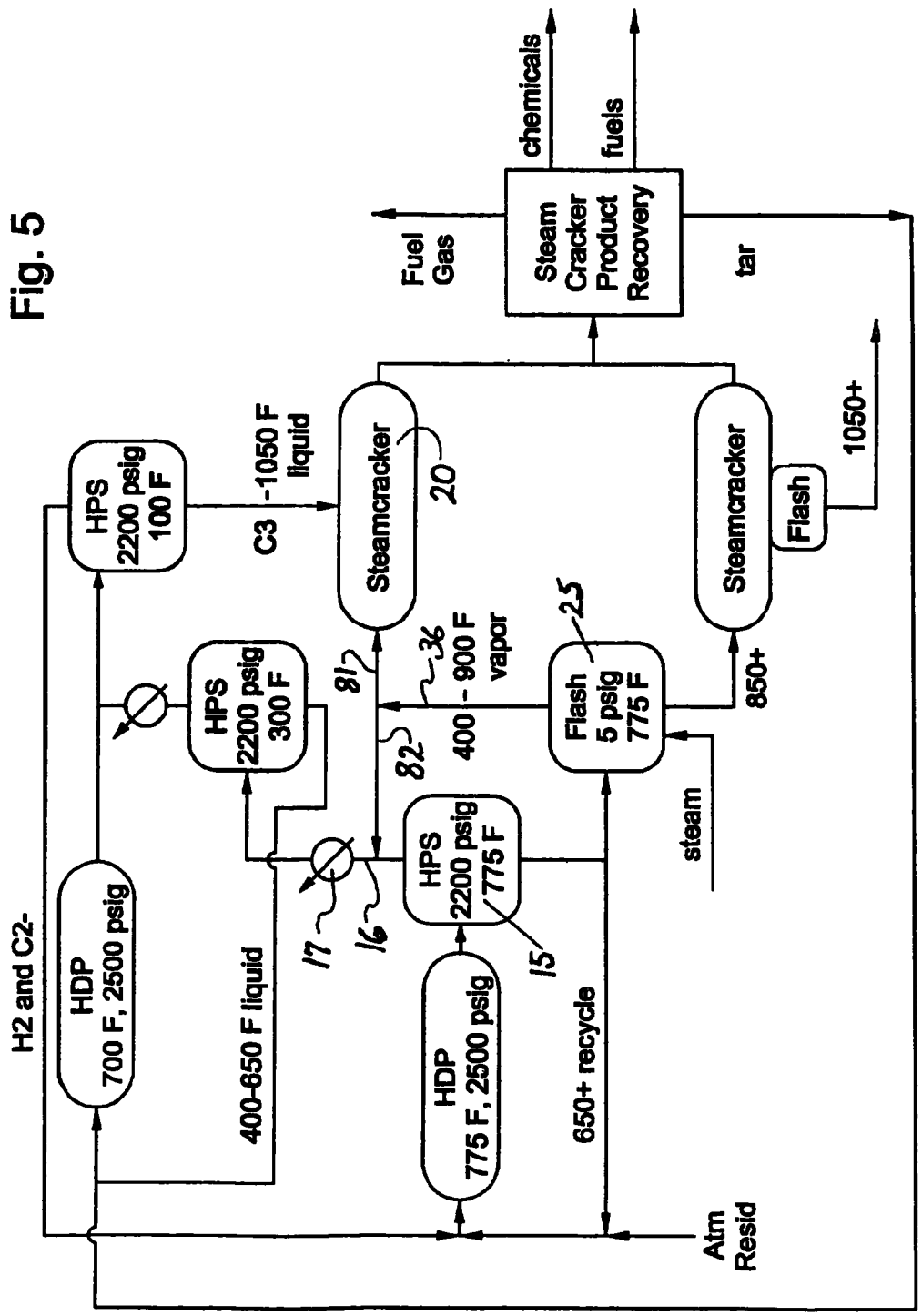

FIG. 5 illustrates yet another exemplary embodiment of the invention. FIG. 5 is similar to FIG. 4, except the operator is provided with an option of sending the overheads 36 (e.g., 400-900° F. (204° C.-482° C.) vapor) from the flash drum 25 to either a steam cracker 20 or to join the overheads 16 from the first HPS unit 15, as shown in FIG. 5, prior to the first heat exchanger 17. Again, in practice, a portion 81 (e.g., 10 to 90 wt % or 40 to 60 wt %) is sent to the steam cracker 20 and a portion 82 (e.g., 10 to 90 wt % or 40 to 60 wt %) is sent to dilute the overheads 16 from the first HPS unit 15. This has the practical effect, inter alia, of providing more $H_2$ and less tar into the first steam cracker 20.

While the above embodiments have been illustrated using, as feed 8, atmospheric resid, the feed may be selected from heavy crude oil, atmospheric and vacuum resids, fuel oil, FCC cycle oils, coker gasoils, cracker tar, topped crude, any other feed containing resid and/or a high concentration of multicyclic heteroatom aromatic species, and combinations thereof. Mixtures of such feeds, such as provided by crude, are also preferred.

FIGS. 1-5 are exemplary only and represent only a small number of the possible optimizations directed to minimize energy usage and maximize efficient use of hydrogen and hydrocarbon feed sources.

By way of further non-limiting example, illustrating yet still another preferred embodiment, which may be a more preferred embodiment of any of the preferred embodiments discussed above, the source of hydrogen used in the system (e.g., the HDP units) is methane, particularly remote methane. Use of remote methane in processing is discussed in U.S. Pat. No. 6,784,329. Use of methane from remote areas or sources of high or underutilized methane volumes in the hydrogenation of the feedstocks to the hydroprocessing unit may facilitate generation of valuable products from steam cracking. The term "remote" is not limited to distant but rather is defined more broadly to include substantially any suitable source of methane that might otherwise only have less valuable options or opportunities than for use in the described processes. Commonly, this includes methane produced in various parts of the world in substantial volumes, that may have limited, costly, or otherwise unfavorable access to markets or limited use.

Maximizing the value of remote methane resources is an old problem in the industry. While methane commands a premium value for the production of hydrogen, neither chemical can be shipped long distances economically.

Crude oil contains a minimum of about 10 wt % hydrogen. Fully hydrogenated (where the crude contains substantially only paraffins and cycloparaffins, having >95 wt % conversion of sulfur, nitrogen, and oxygen-containing impurities), crude may contain as much as about 14-15 wt % hydrogen. This saturated cracker feed is a highly preferred feed in the present invention. Petrochemical yields of crude having 14.5 wt % hydrogen may be increased substantially over crude having 10-11 wt % hydrogen.

A convenient method of converting methane to hydrogen remotely is by exploitation of a steam reforming unit, which are available from numerous commercial sources. In steam reforming, light hydrocarbons such as methane are reacted with steam to form hydrogen and carbon monoxide. The reaction may be illustrated by the well-known Syngas equilibrium equation:

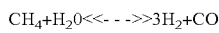

$$CH_4 + H_2O <<\text{- - -}>> 3H_2 + CO$$

Typically, Syngas is exploited by, for instance conversion into lower alkanes by, for instance Fischer-Tropsch catalysts, which may be fed into a naphtha cracker to generate ethylene. However, according to the present invention, hydrogen may be extracted from the product side of the equation and used to hydrogenate crude or resid-containing fraction thereof. The carbon monoxide may be further reacted with steam to form additional hydrogen (and carbon dioxide) in the water gas shift reaction. Other reactions may generate hydrogen from methane, for instance, reaction of methane with oxygen to produce hydrogen and carbon monoxide (partial oxidation).

The present invention thus allows the producer to locate the hydroprocessing HDP unit close to the methane source (e.g., remote methane), hydrogenate feed comprising resid (either from well-heads located near the remote methane or by shipping the resid-containing material to the remote methane), and then ship the product of the HDP unit to the steam cracker (or locate the steam cracker at the remote source).

The present invention provides numerous advantages besides those pointed out above. In preferred embodiments, the invention provides for one or more of the following advantages: (i) use of lowest cost feedstock (feeds high in resid and/or polynuclear heteroatom aromatics; use of remote methane); (ii) low cost integration of feed, including hydrogen, with steam cracker facility, substantially eliminating transportation costs; (iii) single feed simplifies pyrolysis unit design and/or maintenance; (iv) reduces problem of treatment/disposal of resid/asphaltene/tar/sulfur and nitrogen polynuclear molecules ("bottom of barrel"); and (v) provides alternative of production of aromatics product.

The meanings of terms used herein shall take their ordinary meaning in the art; reference shall be taken, in particular, to Handbook of Petroleum Refining Processes, Third Edition, Robert A. Meyers, Editor, McGraw-Hill (2004). In addition, all patents and patent applications, test procedures (such as ASTM methods), and other documents cited herein are fully incorporated by reference to the extent such disclosure is not inconsistent with this invention and for all jurisdictions in which such incorporation is permitted. Also, when numerical lower limits and numerical upper limits are listed herein, ranges from any lower limit to any upper limit are contemplated. Note further that Trade Names used herein are indicated by a ™ symbol or ® symbol, indicating that the names may be protected by certain trademark rights, e.g., they may be registered trademarks in various jurisdictions.

The invention has been described above with reference to numerous embodiments and specific examples. Many variations will suggest themselves to those skilled in this art in light of the above detailed description. All such obvious variations are within the full intended scope of the appended claims.

What is claimed is:

1. A process comprising:
   (i) obtaining a hydroprocessed effluent from a resid hydroprocessing unit, wherein the effluent comprises greater than 5 wt % 343° C.+ resid;
   (ii) steam cracking substantially all of the effluent to obtain a product comprising olefins,
without removal or separation of a hydroprocessed resid fraction from the effluent prior to feeding the effluent into a radiant section of a steam cracker.

2. The process of claim 1, wherein the effluent is hydrogenated and has been subjected to thermal cracking of at least a portion of the resid in the hydroprocessing unit.

3. The process of claim 1, wherein a hydrogen concentration of the effluent from the resid hydroprocessing unit comprises at least about 1 wt % more hydrogen than a hydrogen concentration of a hydrocarbon feed coming into the resid hydroprocessing unit.

4. The process of claim 1, wherein the step of steam cracking comprises adding steam to the effluent from the resid hydroprocessing unit prior to cracking the effluent in a radiant section of a steam cracker.

5. The process of claim 1, further comprising the step of processing crude or a crude fraction containing resid in the hydroprocessing unit to produce the effluent from the hydroprocessing unit.

6. The process of claim 5, wherein the step of processing comprises combining the crude or crude fraction containing resid with hydrogen or a source for hydrogen, at a pressure of at least about 5516 kPa and a temperature of at least 315° C.

7. The process of claim 2, further comprising the step of flashing the hydroprocessed effluent through a pressure drop prior to steam cracking the effluent.

8. The process of claim 6, further comprising the step of utilizing remote methane as a source for hydrogen for hydroprocessing.

9. The process of claim 3, wherein the hydrocarbon feed is a feedstock rich in polynuclear aromatics.

* * * * *